United States Patent
Ramadass

(10) Patent No.: US 9,277,177 B2
(45) Date of Patent: Mar. 1, 2016

(54) HIGH DEFINITION (HD) VIDEO CONFERENCING SYSTEM

(75) Inventor: Sureswaran Ramadass, Penang (MY)

(73) Assignee: JMCS SDN. BHD., Penang (MY)

( * ) Notice: Subject to any disclaimer, the term of this patent is extended or adjusted under 35 U.S.C. 154(b) by 1038 days.

(21) Appl. No.: 13/393,415

(22) PCT Filed: Apr. 26, 2011

(86) PCT No.: PCT/MY2011/000041
§ 371 (c)(1),
(2), (4) Date: Feb. 29, 2012

(87) PCT Pub. No.: WO2012/091536
PCT Pub. Date: Jul. 5, 2012

(65) Prior Publication Data
US 2012/0287225 A1    Nov. 15, 2012

(51) Int. Cl.
*H04N 7/14* (2006.01)
*H04N 7/15* (2006.01)

(52) U.S. Cl.
CPC . *H04N 7/15* (2013.01); *H04N 7/144* (2013.01)

(58) Field of Classification Search
CPC ....................................................... H04N 7/14
USPC .......... 348/14.01, 14.03, 14.08, 14.12, 14.13, 348/14.09
See application file for complete search history.

(56) References Cited

U.S. PATENT DOCUMENTS

| | | |
|---|---|---|
| 2003/0028535 A1 | 2/2003 | Sheldon et al. |
| 2005/0012812 A1 | 1/2005 | Seo |
| 2005/0024484 A1* | 2/2005 | Leonard et al. ............. 348/14.01 |
| 2006/0158509 A1* | 7/2006 | Kenoyer ................ H04N 7/142 348/14.08 |
| 2008/0309751 A1 | 12/2008 | Lam et al. |
| 2010/0110160 A1* | 5/2010 | Brandt et al. .............. 348/14.08 |
| 2010/0225737 A1* | 9/2010 | King et al. ................. 348/14.09 |
| 2011/0211036 A1* | 9/2011 | Tran ........................... 348/14.08 |
| 2012/0047572 A1* | 2/2012 | Duncan et al. .................. 726/13 |

* cited by examiner

*Primary Examiner* — Olisa Anwah
(74) *Attorney, Agent, or Firm* — Schmeiser, Olsen & Watts LLP

(57) ABSTRACT

The present invention relates to a HD video conferencing system (100) that includes at least one video conferencing server (10), an optimization module and at least two HD video conferencing clients (20). The server (10) includes an initiating module configured to initiate a conferencing session among one or more participants, and the HD A/V gateway is configured to distribute HD A/V content among the one or more participants. The optimization module is configured to process the HD A/V content to be shared among the one or more participants for reducing the size of the content. Each of the at least two clients (20) is capable of capturing the HD A/V content, and playing back the captured HD A/V content to the participants during the conferencing session. The communicable coupling between two HD video conferencing clients (20) and the video conferencing server (10) is being done using either Internet Protocol version 4 (IPv4) or Internet Protocol version 6 (IPv6).

14 Claims, 4 Drawing Sheets

HIGH DEFINITION (HD) VIDEO CONFERENCING SYSTEM

CROSS-REFERENCE TO RELATED APPLICATION

The instant application is a national phase of PCT Application No. PCT/MY2011/00041 filed Apr. 26, 2011, pending, which claims priority to Malaysian Patent Application No. PI 2010006358, filed Dec. 30, 2010, pending, the entire specifications of both of which are expressly incorporated herein by reference.

FIELD OF THE INVENTION

The present invention relates to a system and network application for HD video conferencing including HD Audio/Video (A/V) that is able to run on both IPv4 and IPv6.

BACKGROUND OF THE INVENTION

High Definitions (HD) video conferencing enables high quality, full screen eye-to-eye communication between users who are physically apart without even realizing it. It provides users the feeling of being at the same room and table with the remote users thus provides the sensation and experience the executives needed.

Before high-definition encoding/decoding, video conferencing data was encoded based on the Common Interchange Format (CIF). Video standards, known as H.261 and H.263, were developed by the International Telecommunications Union—Telecommunication Standardization Sector (ITU-T). With the H.261 standard, only the QCIF and CIF formats were defined. The Quarter CIF (QCIF) format was applied for conferences at only the lowest data rates (64 Kbps and below) and is rarely used today. Once the H.263 standard was released, more formats (4CIF and 16CIF) were introduced with "full resolution" being defined as 16CIF.

The ITU-T has recently adopted new standards for video compression, the process through which a complete video file is reduced in size so it can be transmitted more economically over a smaller network connection (lower data rate/bandwidth). For high-definition video conferencing, the ITU-T now recommends the H.264 video standard, which provides superior quality at relatively low data transfer rates.

SUMMARY OF THE INVENTION

The High Definitions (HD) multipoint video conferencing system of the present invention is a system that incorporates high definition (HD) audio and video with real time video conferencing system. The system optimizes the high definition (HD) video decompression in software domain. This is done by modifying encoding methods or encoding parameters to improve decoding times without changing the compression standards.

The exponential advancement of central processing unit technology as predicted by Moore's Law provides many opportunities for software engineers to achieve what could not be done before. One such field is video compression and decompression. Latest technology offered by CPU manufacturer now is multi-core processor. To utilize the advantages provided by the newer line of processor, the existing algorithm that use serial programming technique has to be rewritten. This includes many routines in encoding and decoding of video stream. By paralyze encoding and decoding of video streams, our HD multipoint video conferencing system can run on any PC without the need of hardware decoder.

The system consists of client and server. In the client side the core system is separated from the Graphic User Interface (GUI). This allows the system to change the skin very easily. Another important feature of the system is the modularity. To achieve a modular architecture, we used a reliable, efficient and easy to implement inter-process communication. We used Component Object Model (COM), used by Directshow, and the more recent Windows Communication Foundation (WCF) found in the .Net Platform.

The system is able to run on both versions of Internet Protocols (IPs), it means that users uses IPv4 can conference with users uses IPv6 without any modifications. The exchange of HD real time video and audio between heterogeneous clients is done through a HD audio/video gate-way sitting in the server side.

BRIEF DESCRIPTION OF THE DRAWINGS

The present invention will be more fully understood and appreciated from the following detailed description, taken in conjunction with the following drawings and appendices in which.

DETAILED DESCRIPTION OF THE PRESENT INVENTION

System Architecture and Components

Figure 1:
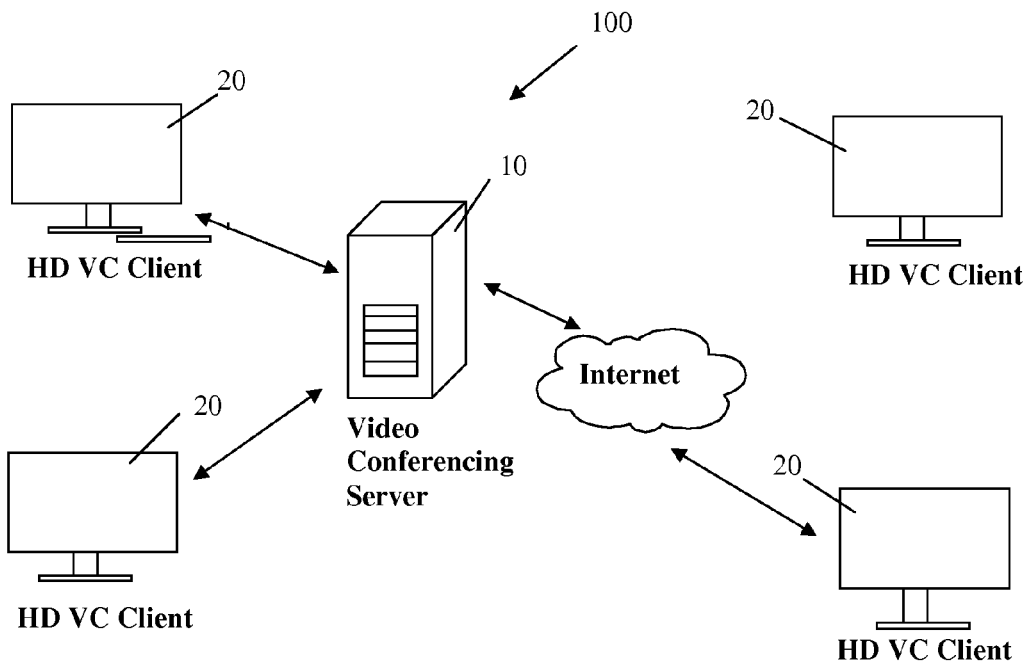
FIG. 1 is a simplified diagram illustration the overall system design and component with their connection.

In accordance with an embodiment of the present invention as shown in FIG. 1, there is shown a multipoint HD video conferencing system (100) of the present invention comprises at least one video conferencing server (centralized server) (10) which is the controller of the conference, and at least two HD video conferencing clients (20). The server (100) contains two modules. The first module is the initial module (core engine) that controls the flow of the conference as well as provides a login platform to the clients (20) to login to the server (100). The initiating module configured to initiate the conferencing session among the one or more participants, the conferencing session enabling the one or more participants to share HD Audio/Video (A/V) content. The second module in the server (100) is the HD audio/video (A/V) gateway which is in charge of reflecting the HD A/V to all participants in the conference. The HD A/V gateway communicably coupled to the initiating module, the HD A/V gateway configured to distribute the HD A/V content among the one or more participants. The video conferencing system (100) also comprises an optimization module communicably coupled to the HD A/V gateway, the optimization module configured to process the HD A/V content to be shared among the one or more participants. The HD video conferencing clients (20) communicably coupled to the optimization module and the video conferencing server (10), each of the at least two HD video conferencing clients (20) capable of capturing the HD A/V content and playing back the captured HD A/V content to the one or more participants during the conferencing session. The communicable coupling between at least two HD video conferencing clients (20) and the at least one video conferencing server (10) is being done using at least one of Internet Protocol version 4 (IPv4) and Internet Protocol version 6 (IPv6).

The optimization module is configured to optimize a rate of decompression of the HD A/V content to process the HD A/V content. The optimization module is configured to modify one or more encoding methods for optimizing the rate of decompression of the HD A/V content. The optimization module is configured to modify one or more encoding parameters for optimizing the rate of decompression of the HD A/V content.

The clients (20) can communicate with the server (10) using Internet protocol. Clients (20) can either use IPv4 or IPv6 as a communication protocol in the IP layer. The client (20) designed to be as platform and technology independent. This is to be able to switch for another platform or technology without having major changes in the system design. The processing of the HD content allows a reduction in size of the HD A/V content to be shared among the one or more participants.

Each of the HD video conferencing clients (20) controls the conferencing session by logging in and logging out the one or more participants. Each of the at least two HD video conferencing clients (20) controls the conferencing session by creating conference sessions for the one or more participants. Each of the at least two HD video conferencing clients (20) controls the conferencing by switching status of the more or more participants. Each of the at least two HD video conferencing clients (20) controls the conferencing by terminating the conference session for the one or more participants. Each of the at least two HD video conferencing clients (20) is further capable of providing feedback of client messages and server messages to the one or more participants. The HD A/V gateway is further configured to translate a IPv6 stream to a IPv4 stream.

The at least one video conferencing server (10) further comprises a control module, the control module configured to control the HD A/V gateway and the at least two HD video conferencing clients. The processing of the HD content allows a reduction in size of the HD A/V content to be shared among the one or more participants.

Figure 2:
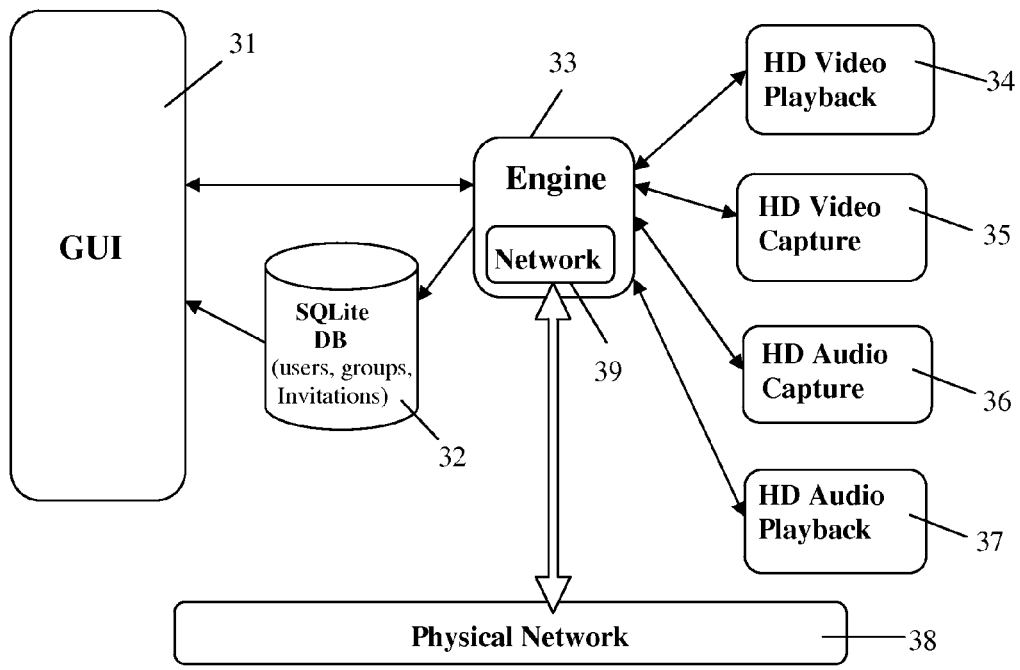
FIG. 2 shows the modules of the client application and their interactions. The modules are: Engine, GUI, Network, SQLite DB, HD Video Playback, HD Video Capture, HD Audio Playback and HD Audio Capture.

The client logical structure and modules is as shown in FIG. 2. The modules are: Engine (33), GUI (31), Network (39), SQLite Data Base (32), HD Video Playback (34), HD Video Capture (35), HD Audio Playback (37) and HD Audio Capture (36).

The engine (33) is the central component of the client. It is in charge of managing all the events and the states of the other modules. It coordinates with all the modules in order to keep them in a coherent state. The engine (33) is also the place where all the information is stored: conferences, invitations, server data, users list, etc. The engine (33) is independent of the underlying network layer which is handled by the network module.

The network module (39) handles all the information and operations of the engine (33) related to the network. The communication between the client (20) and the server (10) uses a reliable TCP connection and must support both IPv4 and IPv6 networks. The network module (39) has two main roles:

1—Build messages according to the Engine inputs and send them to the server (10);

2—Receive messages from the server (10), decompose them and send the contained information to the Engine (33).

Figure 3:
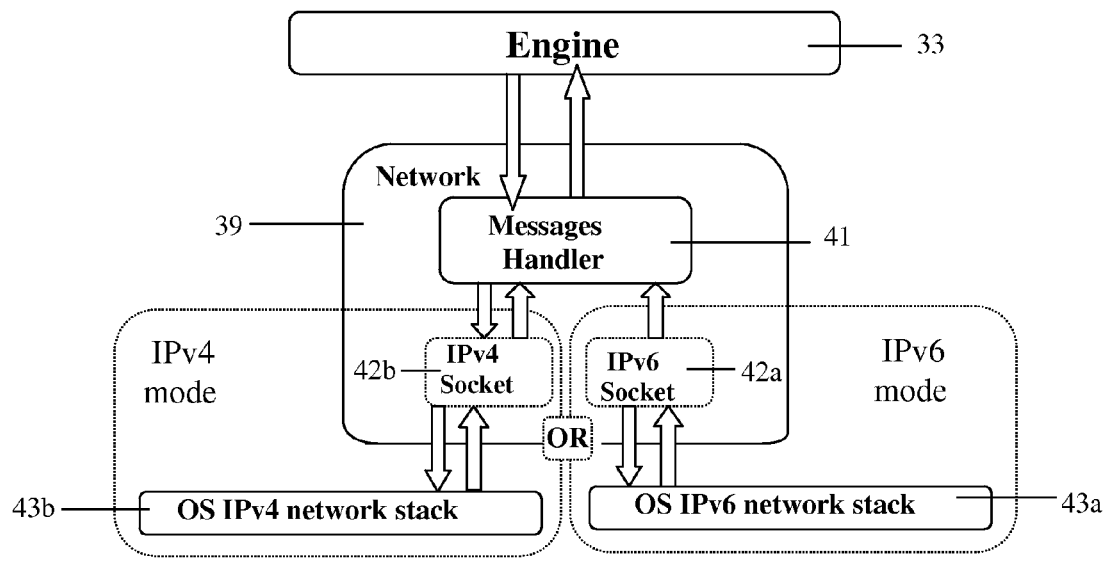
FIG. 3 shows the components of the Network module inside the client with their connection.

FIG. 3 shows the components of the Network module (39). The Messages Handler is the component responsible for the composition of the messages sent to the server (10) and decomposition of the ones received from the server (10). It is also the interface between the Network module (39) and the Engine (33).

The work of the Network module (39) is two way streams, either the message are sent downstream or received upstream. Downstream means when the Engine (31) needs to send a message to the server (10), for example when the client (20) wants to log in. the Engine (33) calls the appropriate function of a message handler (41) (i.e.: "login(char* name, char* password)"). The message handler (41) builds the body of the message to be sent to the server (10). Once the message body is built, it is sent through the socket (42a, 42b) object which adds the necessary header according to the IP version used and sends it to the server (10) via the OS network stack (43a, 43b).

Upstream means when a message is sent by the server (10) and received by the socket (42a, 42b) object through the network stack (43a, 43b). The network socket (42a, 42b) passes it to the message handler (41). The message handler (41) reads the content of the messages and calls the appropriate function(s) of the Engine (33).

Each of the at least two HD video conferencing clients (20) further capable of controlling the conferencing session; and monitoring the conferencing session through a Graphical User Interface (GUI) (31) thereof. The GUI (31) is responsible for giving visual information and providing access to the program's functions to the user. The modular architecture allows an easy switch of the GUI (31) from one skin to another. The GUI (31) is not responsible for the display of the videos; this part is handled by a filter in the video capture (35) and the video playback (34).

The video conferencing server (10) further comprises a registration database for receiving registration from the at least two HD video conferencing clients. The registration database is SQLite database (DB) (32). The database (32) is used to store users information's such as user name, user group etc. The database (32) offers many advantages. The most important is there won't be any delay in the transmission of the information from the Engine (33) to the GUI (31). Whenever the Engine receives new groups, new users or an update, it writes the information to the database. Whenever the GUI (31) needs the users or groups information, it can read it directly from the database (32); it doesn't even need to request it from the Engine (33). Moreover, reading even a thousand records from a database (32) is almost instantaneous since databases (32) are optimized for this kind of operations.

Figure 4:
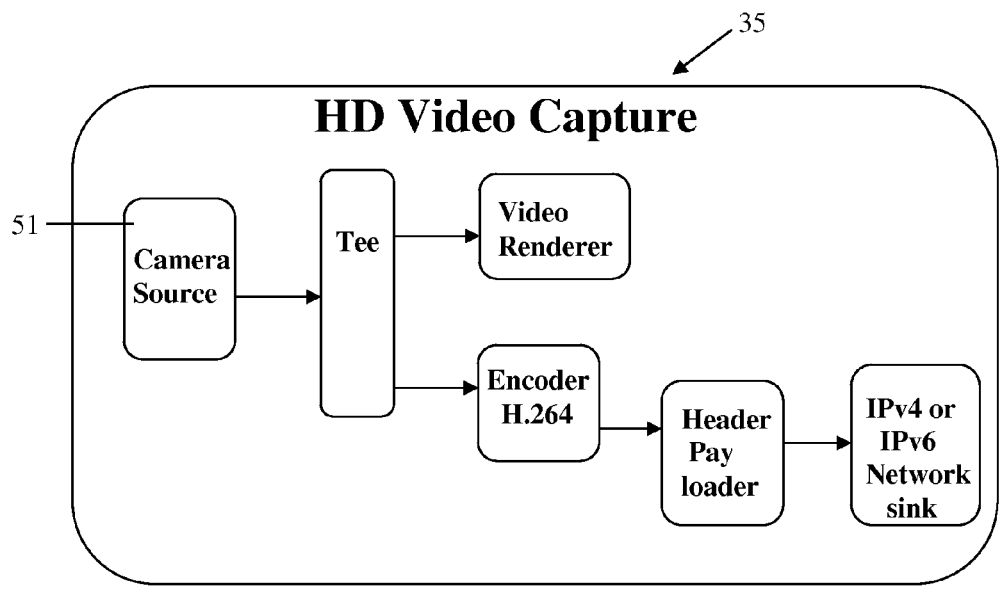
FIG. 4 shows the components of the HD Video capture module with their connection.

FIG. 4 shows the components of the HD video capture module (35). The HD video capture (35) is in charge for capturing the images of the camera (51), displaying the local video to the user, encoding the captured frame and sending them to the destination. The destination can either be a single recipient for IPv4 Point-to-Point conference or IPv6 Point-to-Point conference, the HD A/V gate-way for IPv4 or IPv6 client in a Multipoint conference or the HD A/V gate-way for IPv4/IPv6 Point-to-Point conference. The HD video capture (35) is the most critical component of our application as HD video encoding requires a high amount of processing power. The application is built around it in order to make sure that the HD encoding has enough resources to not slow down the whole system.

Figure 5:
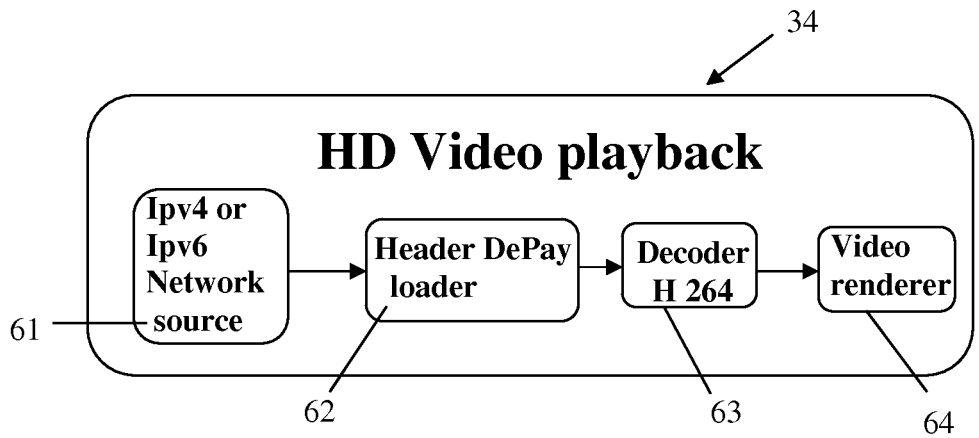
FIG. 5 shows the components of the HD Video playback module with their connection.

FIG. 5 shows the components of the HD video playback module (34). The HD video playback (34) is in charge for receiving encoded frames, decoding and displaying them. Its structure is rather simple as it follows exactly each task it realizes. The "network source" (61) filter receives the frames from the network and passes them to the "header de-pay loader" (62). Again, there will be two version of the network filter, one for IPv4 and one for IPv6 with only the required one instantiated at runtime. The "header de-pay loader" (62) reads the information of the application header, removes it from the frame and passes the stripped frame to the "decoder" (63) filter. The information in the application header may be used for example to check that the frame is coming from the expected user or to drop out-of-sequence frames. The decoder (63) processes the frame and passes the raw decoded frames to the "video renderer" (64) filter that displays them.

Figure 6:
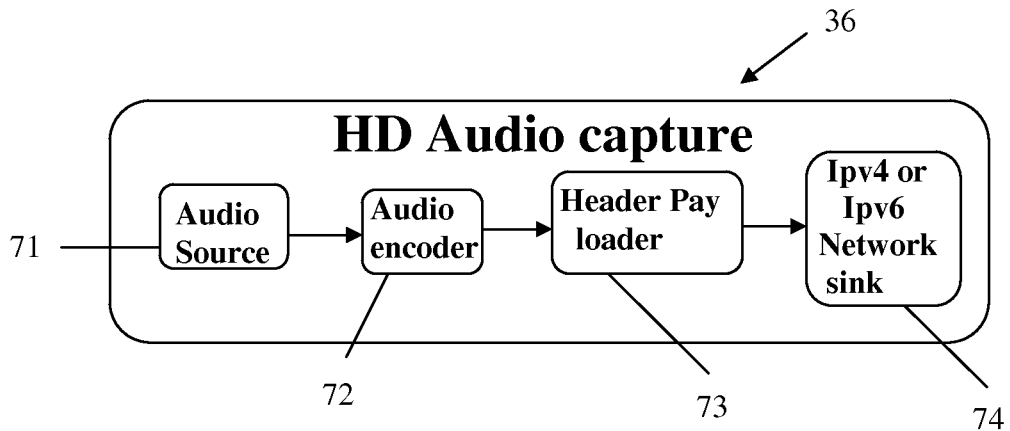
FIG. 6 shows the components of the HD Audi capture module with their connection.

FIG. 6 shows the components of the HD audio capture module (36). The HD audio capture (36) captures the voice from a microphone plugged to the audio card or chip of the machine, encodes and sends to the network. An "audio source" (71) filter is responsible for getting the raw audio from the audio card. The raw audio is then passed to the "audio encoder" (72). The encoded audio is then passed to the "header pay loader" (73), which works exactly as in the video capture. Finally the Pay-loaded audio frame is passed to the "network sink" (74), either IPv4 or IPv6, to be sent over the network.

Figure 7:
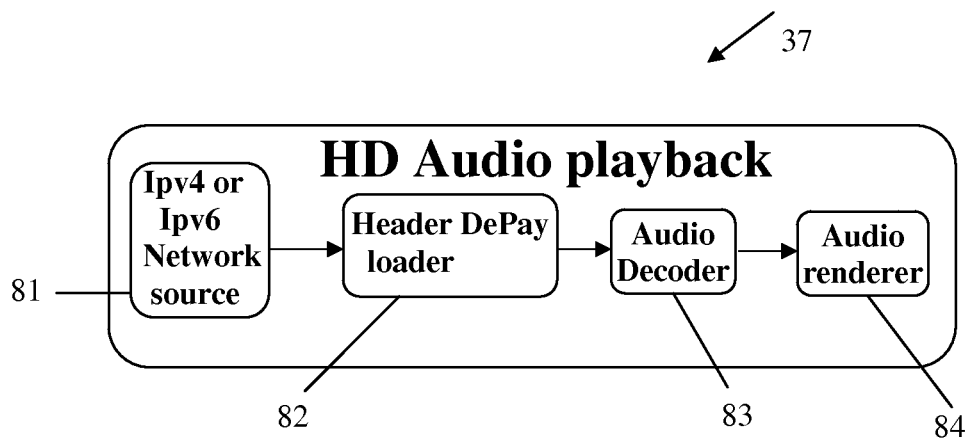
FIG. 7 shows the components of the HD Audio playback module with their connection.

FIG. 7 shows the components of the HD audio playback module (37). The HD audio playback's role is to receive the audio packets, decode them and play them through the computer sound card. The "network source" (81) filter receives the audio packets and passes them to the header de-pay loader (82). The "header de-pay loader" (82) removes the application header and can operate some checking on the codec type, originating user, etc. Once the packets are de-pay loaded, they are passed to the "decoder" (83) and finally played by the "audio renderer" (84).

The system optimizes the high definition (HD) video decompression in software domain. This is done by modifying encoding methods or encoding parameters to improve decoding times without changing the compression standards.

Embedded Database to Support Up to 1000 Users Per Server

The conferencing server (10) is able to support up to 1000 users. The server (10) stores the users list as a text file which contains several information like the encrypted user's password, the user's unique id or the user's group's id. Every time a user logs in, the server (10) parses the file and sends the users list to the user logging in. The users list is broken up into several messages, each message containing up to 14 users. This list of users has to be displayed when a user creates a conference and wants to choose who to invite.

The HD A/V gateway comprises a table that includes information about all conducted conferences. The HD A/V gateway is further configured to create additional entries in the table. The server (10) users list can contain up to 1000 records, which means the client (20) can receive up to 72 messages for the users list alone. In our system, we want the duration between the time the user clicks on the login button and the time the users list is ready to be displayed on the client (20) to be as short as possible. The target is to have maximum 2 seconds, ideally less, since we do not want the user to have to wait if he wants to create a conference immediately after the login. Moreover, the client (20) does not know in advance the number of users on the server (10), meaning it doesn't know how many users list messages it will receive.

The server (10) parsing of the users text file and the sending of the messages is very fast, only few milliseconds (in good network condition). On the client (20), the reception, parsing of the messages, insertion in the database (32) and reading of the database (32) by the GUI (31) for display must therefore be very fast and efficient. The solution adopted to pass efficiently the users list between the engine and the GUI (31) was to use a database (32). If the Network module (39) read the user structures in it one by one and for each user, the network calls a method on the Engine module (33) to add a user, the engine (33) would make one writing for each user. This solution proved to be very slow. When benchmarking the application for adding 800 users in the database (32), it would take more than 1 minute 30 seconds. The problem was not with the database (32) itself as it can do theoretically more than 50000 insertions in 1 second. The limitation comes from the hard disk on which we write the database (32) which is limited on the number of writing per second. Modern hard disks rotate at 7200 rpm (rotation per minute). Doing one writing on a file takes at least 2 rotations. So if we calculate the number of possible writing per second we get 7200 rpm/60=120 rotations per second; 120 rotations per second/2=60 writings per second.

The idea to improve further the performance is to have the Engine (33) writes to the database (32) for all users messages at once (or at least for several messages at once), instead of a writing for every message. The problem is the client (20) doesn't know how many messages it will receive, so it doesn't know which message will be the last one and therefore it is impossible for the Network module (39) to have a rule of type "if processing the last message, ask the Engine (33) to write to the database (32) its cached users list".

Figure 8:
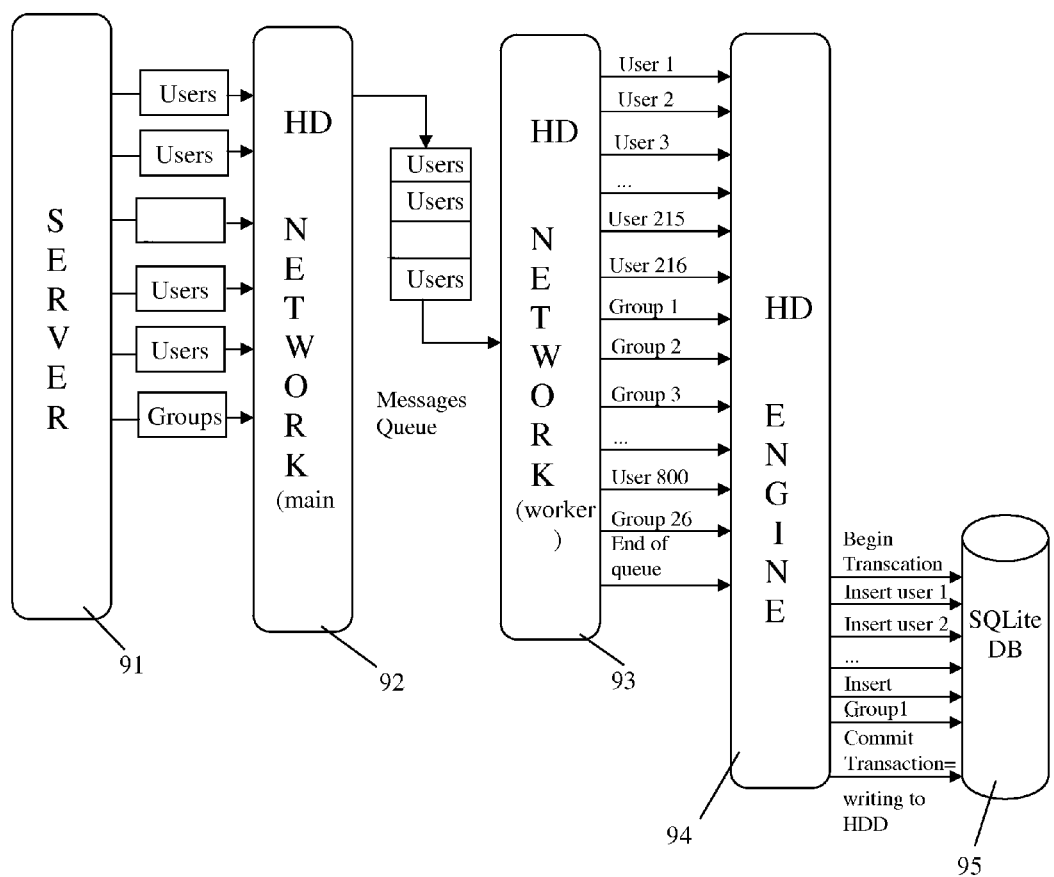
FIG. 8 shows the Users List writing into Database procedure with the threads involved and messages.

The solution adopted is to add packet polling in the Network module (39) (see FIG. 8). The main Network module (39) thread keeps receiving the users list messages as fast as it can and push them into a temporary message queue; on the other side of the queue, a worker thread pulls the messages, reads the users structures in them, passes the user's information one by one to the Engine (33) and only when the worker thread "starves" (=the message queue is empty), it instructs the engine (33) to write to the database (32). The Engine (33), just caches the users' information into a temporary list and when it is told by the Network, it writes all the users at once into the database (32) in a unique transaction which means there is only a single writing to the hard disk for the whole cached users list.

Because the reception and the queuing of messages by the main thread is much faster than the pulling and processing by the worker thread, in good network condition, all the messages will be processed at once and will result by only one writing to the database. The time taken to receive and write 800 users into the database (32) is only about 230 milliseconds (=0.23 seconds).

Inter-Process Communications

The inter-process communications are heavily depending on the client—server communication. Also all the WCF calls between the GUI (31) and the Engine (33) are made asynchronously which means that the caller process will not wait for the called method to finish before continuing its processing. This is to avoid that one module is blocked when the other one encountered an issue or that the GUI (31) becomes unresponsive when it calls an Engine method which takes some time to complete. The asynchronous calling is the reason why we can see many operations of type "request" and "reply": the request starts the processing and the corresponding "reply"

method is use to return the result of the operation. The operations related to the system are described in the following sections.

1—Login, Logout and Updates Operations:

The first action possible on the application is to login on to the conferencing server (10). When the user clicks on the "Login" button of the main GUI form, the GUI (31) requests the Engine (33) to connect to the server. The Engine (33) deletes all users, groups and invitations records from the database to ensure there is no information left from a previous login, reads the server IP and connection port from the registry and instructs the Network module (39) to connect to the server (10). The result of the connection (either success or an error code) is returned to the GUI (31) through a WCF callback. If an error occurred (server unreachable, connection timeout . . . ) the GUI (31) displays the error description.

Upon successful connection, the GUI (31) displays the login form to the user so he can enter his username and password. Once validated, the GUI (31) passes the username and password to the Engine (33) to send the login request to the server (10) trough the Network module (39). The server replies and the reply code and login information are passed to the Engine (33) which in turn informs the GUI (31). If a login error is returned by the server (10) (wrong password, unknown user . . . ), the processing stops there. If the login is successful, the Engine (33) automatically requests the users, groups and conferences invitations list from the server and the Engine (33) updates the local user's status on the server (10) to 'available'. In reply, the server (10) sends the users list, the status updates for the users already logged in, the groups list and the conferences invitations list. Note that the number of these messages is variable and their order is not guarantee. As explained before, these messages are received by the main Network thread and queued into a temporary list. The Network (39) worker thread reads the queue and processes each message one by one, reading the structures in them and passing the information to the Engine (33).

The Engine (33) caches the information but does nothing else until the Network worker thread detects that the message queue is empty and calls a method on the Engine (33) to request the cached information to be written in the database. As result, the Engine (33) starts a database transaction, inserts or updates all the cached records and finally commits the transaction which results with all the information being physically written at once into the database (32). If the local user is invited to a conference, the engine informs the GUI (31). The GUI (31) shows to the user the invitations list form which reads the database (32) to retrieve the conference(s) invitation information. When a user tries to log in the server (10) with a username already in use, the server sends keep-alive messages through the connection of the user already logged in. These messages test if the previous connection is still "alive". It sometimes happens, due to network issue, the server (10) is not aware that the user has logged out from the connection was not closed properly. By sending several keep-alive messages though the connection, it will speed up the detection of the dead connection on the server (10) end. When receiving such message, the client Network module just discards it.

When the user clicks on the "logout" button, the GUI (31) calls the "logout" method on the Engine (33) which in turn calls the "logout" method of the Network. The Network simply closes the TCP connection and the Server will automatically detect the user logged out. The GUI (31) should only allow the user to logout when he is not in a conference. If not, the user must leave the conference before to log out. All modules should liberate their resources and liberate the memory when receiving the logout notification.

For maintenance purpose, the server sometimes needs to be shutdown. In that case, the server (10) sends a shutdown notification to all logged in users. In case there is network issue with the server (10) or there is server crash, the connection might suddenly be closed. Both these cases are handled by the client in the same way. First, the server (10) sends a shutdown message or the connection to the server (10) is closed. When the Network module receives the message or detects the connection is closing, it informs the Engine (33) and closes the connection to the server on his side. If the local user is in a conference, the Engine (33) immediately kills all instances of audio and video capture and playbacks and sends a server shutdown or server connection closed notification to the GUI (31). In response, the GUI (31) should close any form opened and go back to the initial logout state.

Every time a remote user updates his status, the server (10) sends a status update to all the logged in users. The main Network module thread queue the message for the worker thread to process it and to inform the Engine (33). If the update is a new login notification (the remote user just logged into the server) the Engine (33) sends a notification to the GUI (31) which may display a visual notification to the user (ex: info bubble at the corner of the screen "User "xxxxx" has logged in"). If the local user is currently in a conference and the update is for a participant of the same conference, the Engine (33) also informs the GUI (31). It is important because the update contains video and audio status information about the remote participant which is a critical piece of information during a conference. Finally, when the message queue is empty, the worker thread notifies the Engine (33) and the Engine (33) writes the remote user updated information into the database (32).

The last type of update is the server components status. This update is used to inform users about the status of the A/V gate-way. It is important for clients want to create multipoint conference and clients want to create a point-to-point conference with different IP version clients to know since without the A/V gate-way, the audio and video transmission will be broken. The server (10) sends a server status update message to the client. Upon reception, the Network module informs the Engine (33) which in turns informs the GUI (31).

The GUI (31) should inform the user that the A/V gate-way is down. Also, client should not be able to create new multi-point conference as long as the A/V gate-way is down because they won't be able to receive audio or video. Client can only create point-to-point conferences with the same IP version clients (IPv4 to IPv4 Point-to-Point conference or IPv6 to IPv6 Point-to-Point conference).

Conference Related Operations:

When the user wants to create a conference, it clicks on the "Create" button of the main form. The GUI (31) shows the conference creation form and the user clicks the "Next" button after he has chosen the type of conference he wants to create. The conference creation request is then forwarded to the server through the Engine and the Network modules. The server performs some checking and the reply is sent back to the GUI (31) through the Network and the Engine (33). If the reply is an error, the conference creation is cancelled and the GUI (31) should display the error description to the user.

If the conference creation is authorized, the Engine and GUI (31) saves the conference information (conference id and multicast IP generated by the server, stream base port . . . ) when they get the reply. The GUI (31) can now display the users list to the local user for him to choose who to invite. The users list is read from the database. Once the user has selected one or more participants, the GUI (31) marks the invited user as invited in the database (32) thanks to the flag "is_invited" of the users table "UserDb". The GUI (31) informs the Engine (33) that new users have been invited, shows the loading dialog to the user and informs the Engine (33) that the GUI (31) is ready for the Engine (33) to load the audio and video modules.

Upon calling of the method "AddInvitedUserstoConf", the Engine (33) reads the invited users list from the database (32). It passes the invited users' information to the Network. Each message sent to the server containing the invited users list can only contains up to 10 users. Therefore, every ten users, the Network immediately sends a message and creates a new one for the following invited users. The Engine (33) notifies the Network module when reaching the end of the invited users list, so the Network can send any "incomplete" invited users list message (=the last message might contain less than 10 users hence called "incomplete").

After processing the invited user list, the call to "LoadAudioVideoAsync" makes the engine starts the audio and video modules processes by executing them and then immediately calls their respective loading method. Thanks to callbacks, the Engine (33) knows when the modules are loaded and if any error happened during the loading. The Engine can now inform the GUI (31) that the modules are loaded and inform of the audio and video modules statuses thanks to the WCF operation "AudioVideoLoadedAsync". Except if there was a critical failure during the loading, the GUI (31) then goes into conference "mode" by closing the loading dialog and showing the conference monitor. Once done, it informs the Engine (33) it is ready for the conference. The Engine (33) immediately sends a status update to the server to update the local user's status as "in conference" and to update his video and audio statuses shall any error have occurred during the loading (ex: capture card not found, codec error preventing the audio or video to load . . . ). The Engine (33) also indicates to the video capture module to start to play the captured video locally which means the local user sees his own video, but without encoding or streaming it yet.

In receiving invitation stage, the invitation is sent by the server, received by the Network and queued for processing in the Network worker thread. The worker thread reads the message and informs the Engine (33). Once the worker thread queue is empty, it calls the Engine (33) method to write the invitation physically in the database. The Engine (33) writes the invitation information to the database and informs the GUI (31) it received a new invitation. The GUI (31) reads the conference invitations list from the database (32) in order to display an invitation notification to the user.

When the user choose a conference to join in the conferences invitations list form, the GUI (31) send a join conference request to the Engine (33) which is forwarded to the server through the Network module. The server (10) checks if the user is allowed to join and sends a reply which is received by the Network module and passed back to the Engine (33). If the user is authorized to join, the Engine (33) reads the conference information from the database (32) and forwards the reply code and some of the conference information to the GUI (31). If the reply is an error, the GUI (31) displays a visual notification to the user and the conference joining is cancelled.

If the user is authorized to join, the GUI (31) displays a loading dialog to the user and requests the Engine (33) to load the Audio and Video modules. The Engine (33) starts the Audio and Video modules processes and immediately asks them to load. Once the modules are loaded, the Engine (33) informs the GUI (31), which can enter into conference mode (=show the conference monitor) and tells the Engine (33) it is ready for the conference. Next, the Engine (33) sends a message to the server through the Network to update the user's status as "in conference" and to update his video and audio status shall any error have occurred during the loading (ex: capture card not found, codec error preventing the audio or video to load . . . ).

The Engine (33) sends a message to inform the server (10) it is now ready for the conference while starting the local display of the video capture and the audio and video playback for the chairman streams. Upon reception of the message from the client, the server (10) automatically replies by sending the participants, the queue and the active lists. The participants list messages are queued by the Network main thread to be processed by the Network worker thread which reads the structure in them and passes the information to the Engine (33). Once the message queue is empty, the cached participants list is written to the database by updating the flag "is_invited" of the users table. The Engine (33) then tells the GUI (31) to refresh its own internal participants list by finding the users marked with the "is_invited" flag in the database (32).

The active and queue list are processed directly by the main Network thread. This is because these messages contain only few records and therefore in that case, WCF is adequate. Using the database (32) would have added too much complexity to it while not offering any performance increase due to the low amount of data to transmit. Therefore for each active or queued user, the Network calls the corresponding method on the Engine which in turn calls the corresponding method on the GUI (31).

In a point-to-point conference, most of the steps are exactly the same as for a multipoint conference. However, when the Engine (33) sends the ready for conference message to the server, it only starts to play locally its own captured video without starting the playback yet. It is only when the server sends the message containing the point-to-point conference information (=IP of both ends of the P2P conference) that the Engine starts the audio and video playback for the chairman and also start directly the audio and video transmission of its own stream. This is because in a point-to-point conference, both ends start immediately to send and receive the audio and video streams when the other end joins the conference without the need to request to be active.

To end a conference, the chairman clicks on the button to end the conference, the GUI (31) informs the Engine (33). The Engine (33) unmarks all the invited users in the database and informs the Network to send a message to the server. Next, the Engine kills all the instances of audio and video capture and playbacks created for the conference. Finally, the Engine (33) informs the server that the status of the user is now "available".

The server (10) sends a "conference ending" message to all the invited users. This message can be of any of the 4 values: the conference was ended "normally" by the chairman, the conference was ended "abnormally" by the server (usually due to a disconnection with the chairman), the local user was dropped from the conference by the chairman or an error occurred before the user could join. The network informs the Engine (33) of the termination of the conference. The Engine (33) then deletes the invitation from the database and updates the invitation flag on the users table to 0.

The Engine (33) kills all the audio and video capture and playback instances, update the user's status on the server and informs the GUI (31) that the conference ended with the termination status. The GUI (31) should quit the "conference mode" and return to the logged in form (main form).

During a conference, the chairman has the possibility to invite new participants. This process is the same as the invitation process when creating a conference.

Any participant is able to leaves a conference at any point of time. When the user clicks the "leave" button, the GUI (31) informs the Engine before to leave the conference display mode. The Engine (33) first update the database to unmark all the invited users and kills all the instances of audio and video capture and playbacks created for the conference. Each module should destroy all the objects created for the conference at this point. Finally, the Engine (33) informs the server that the local user has left the conference before to changes his status as being available.

The conference chairman has the privilege of dropping a participant from the conference. To perform this action, the chairman needs to select a participant then click drop. The GUI (31) informs the Engine which user is dropped; the Engine (33) checks that it is possible for the user to perform such action and passes the information to the Network which sends a "drop user" message to the server. When the local user is dropped by the chairman, it is considered as conference ending message of type "S_CONF_DROPUSER".

Most of the conference operations are sent to the server using a client conference update message. Client conference updates allows a participant to request ("REQ"), to release ("REL") or to unqueue ("UNQ"). For the chairman, it allows to force a user to become active ("REQ"), to force a user to release ("REL") or to change the status of an invited user (observer <-> participant) ("CHGSTS"). To be more user-friendly, the GUI (31) controls the possible user's operation according to his current conference status: observer, participant, active, in queue or chairman. However, the Engine (33) always checks whether the action sent by the GUI (31) is possible. The flow is always the same, whatever the operation. The GUI (31) informs the Engine (33) of the user's action. The Engine (33) checks if the local user is allowed to perform the operation (ie: is the local user the conference chairman, is the local user active before it releases . . . ). If the operation is permitted, the Engine (33) informs the Network which sends a conference update to the server.

At the moment, nothing happens to the audio and video modules as the client must wait for the server confirmation before to start or stop the audio and video transmission. Server conference updates are sent to all the joined participant of a conference. The server conference updates can be separated into six groups.

The $1^{st}$ server conference update is ADDPAR. When the chairman invites new user during the conference, the newly invited users list is sent to the participants using a conference update of type "ADDPAR". This conference update is processed in the same way the participant list is processed when the user joins the conference. The main Network thread queue the message. The message is read by the worker thread and the information about the invited users is passed to the Engine (33). Once the message queue is empty, the worker thread notifies the Engine which writes to the database. The Engine (33) then informs the GUI (31) to refresh its own list.

The $2^{nd}$ server conference update is ACT. When a user becomes active, the server sends a conference update "ACT" to the participants. The conference update is received by the Network which informs the Engine which in turn informs the GUI. If the conference update concerns a remote user (the user's id in the message is different from the local user's id), then the Engine (33) plays the audio and video playback for the active user concerned. If the conference update concerns the local user (the user's id in the message is the same as the local user's id), then the Engine plays the audio capture and starts the video capture transmission.

The $3^{rd}$ server conference update is INQ, CHGSTS or UNQ. For all these conference updates, the communication works the same way. The difference will be in the processing by the Engine (33) and the GUI. The conference update "INQ" means a user is moved to the active queue, "CHGSTS" means a user invitations type is changed (participant <-> observer) and "UNQ" means a user is removed from the active queue. First the Network module receives the conference update from the server. The conference update type and information is passed to the Engine (33). The Engine (33) ensures the update is consistent with the current state of the application and if it is, the Engine informs the GUI (31). The GUI (31) display should then be updated according to the conference update type.

The $4^{th}$ server conference update is JOIN. When the client receives a conference update of type "JOIN", it means a remote participant is joining the conference. The conference update is received by the Network module which informs the Engine. The engine updates the conference status of the user in the database to "Joined" and informs the GUI (31) only if the local user has already joined the conference. This is for the GUI (31) to update the conference monitor display. If the local user is the chairman, it starts the audio and video encoding and streaming when the first participant joins the conference.

The $5^{th}$ server conference update is LEAVE, ABLEAVE or DROP. These conference updates are received by the remaining participants of a conference when one of them leave the conference either normally (=LEAVE), abnormally (=ABLEAVE) or is dropped by the chairman (DROP). When receiving one of these conference update, the Network module calls the corresponding operation on the Engine (33). The Engine (33) update the database by either marking the user conference status as "left" if he left or by removing his invitation flag "is_invited" if he has been dropped. The Engine then informs the GUI (31). If the user leaving or dropped was active, the Engine stops the corresponding audio and video playbacks. Finally, if the local user is the chairman and the user leaving or dropped was the last joined user, it must stop the audio and video capture streaming. Indeed, there is no need to send the audio and video packet if there is nobody to receive them. The streaming will restart when a user joins the conference.

The $6^{th}$ server conference update is REL or KILL. When a user releases his active token or when the chairman removes a user from the active list, the server sends a conference update "REL" or "KILL" to the participants. The conference update is received by the Network which informs the GUI (31) through the Engine (33). If the conference update concerns a remote user (the user's id in the message is different from the local user's id), then the Engine (33) stops the audio and video playback for the active user concerned. If the conference update concerns the local user (the user's id in the message is the same as the local user's id), then the Engine (33) stops the audio capture and the video transmission.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

The invention claimed is:

1. A high definition (HD) video conferencing system (100) capable of conducting a conferencing session between one or more participants, the HD video conferencing system (100) comprising:
   at least one video conferencing server (10) comprising:
   an initiating module configured to initiate the conferencing session among the one or more participants, the conferencing session enabling the one or more participants to share HD audio/video (A/V) content, and
   a HD A/V gateway communicably coupled to the initiating module, the HD A/V gateway configured to distribute the HD A/V content among the one or more participants;
   an optimization module communicably coupled to the HD A/V gateway, the optimization module configured to process the HD A/V content to be shared among the one or more participants; and
   at least two HD video conferencing clients (20) communicably coupled to the optimization module and the at least one video conferencing server (10), each of the at least two HD video conferencing clients (20) capable of capturing the HD A/V content, and playing back the captured HD A/V content to the one or more participants during the conferencing session,
   wherein the communicable coupling between at least two HD video conferencing clients (20) and the at least one video conferencing server (10) is being done using at least one of Internet Protocol version 4 (IPv4) and Internet Protocol version 6 (IPv6),
   wherein the processing of the HD content allows a reduction in size of the HD A/V content to be shared among the one or more participants, and
   wherein the optimization module is configured to optimize a rate of decompression of the HD A/V content to process the HD A/V content without changing the compression standards.

2. The system (100) of claim 1, wherein each of the at least two HD video conferencing clients (20) if further capable of controlling the conferencing session; and monitoring the conferencing session through a Graphical User Interface (GUI) thereof.

3. The system (100) of claim 2, wherein each of the at least two HD video conferencing clients (20) controls the conferencing session by logging in and logging out the one or more participants.

4. The system (100) of claim 2, wherein the each of the at least two HD video conferencing clients (20) controls the conferencing session by creating conference sessions for the one or more participants.

5. The system (100) of claim 2, wherein each of the at least two HD video conferencing clients (20) controls the conferencing by switching status of the more or more participants.

6. The system (100) of claim 2, wherein each of the at least two HD video conferencing clients (20) controls the conferencing by terminating the conference session for the one or more participants.

7. The system (100) of claim 1, wherein each of the at least two HD video conferencing clients (20) is further capable of providing feedback of client messages and server messages to the one or more participants.

8. The system (100) of claim 1, wherein the optimization module is configured to modify one or more encoding methods for optimizing the rate of decompression of the HD A/V content.

9. The system (100) of claim 1, wherein the optimization module is configured to modify one or more encoding parameters for optimizing the rate of decompression of the HD A/V content.

10. The system (100) of claim 1, wherein the at least one video conferencing server (10) further comprises a registration database for receiving registration from the at least two HD video conferencing clients (20).

11. The system (100) of claim 1, wherein the HD A/V gateway comprises a table that includes information about all conducted conferences.

12. The system (100) of claim 11, wherein the HD A/V gateway is further configured to create additional entries in the table.

13. The system (100) of claim 1, wherein the at least one video conferencing server (10) further comprises a control module, the control module configured to control the HD A/V gateway and the at least two HD video conferencing clients (20).

14. The system of claim 1, wherein the HD A/V gateway is further configured to translate a IPv6 stream to a IPv4 stream.

\* \* \* \* \*